UNITED STATES PATENT OFFICE.

RENIER ESTHER HERMAN JONKERGOUW, OF BILLANCOURT, FRANCE, ASSIGNOR TO LA SOCIÉTÉ ANONYME DU CHRYSO-CERAME, OF PARIS, FRANCE.

MANUFACTURE OF GLASS ARTICLES.

No. 845,552.     Specification of Letters Patent.     Patented Feb. 26, 1907.

Application filed July 26, 1906. Serial No. 327,943.

*To all whom it may concern:*

Be it known that I, RENIER ESTHER HERMAN JONKERGOUW, a subject of the Queen of Holland, and a resident of Billancourt, France, have invented a new and useful Improvement in or Relating to the Manufacture of Glass Articles, which improvement is fully set forth in the following specification.

The manufacture of glass articles has been effected hitherto by melting at a high temperature the raw material used and subsequently molding or blowing it while hot, so as to give the molten matter the desired shape.

This invention relates to a process in which the molding takes place while the material is cold.

Broadly stated, the invention consists in preparing a mixture of materials which is capable of being converted into glass by the application of heat, molding these substances, thoroughly mixed, when cold, and then submitting them to the action of heat while still in the mold.

The substances used are as follows: Fontainebleau sand, carbonate of soda, borax, chalk, and minium. Fontainebleau sand may be replaced by any other suitable sand or by quartz reduced to powder. Carbonate of soda may be replaced by carbonate of potash to which may be added a small quantity of nitrate of potash. The proportions in which these substances are mixed together may vary, as will be readily understood, in accordance with the transparency of the product to be obtained. By way of example, the following proportions could be used: Fontainebleau sand, 608; minium, 300; carbonate of soda, 50; borax, 12; chalk, 30; total, 1,000. To the mixture thus constituted may be added, further, one thousand parts of Fontainebleau or other suitable sand.

Compositions may be employed in which the proportion of Fontainebleau sand is as low as three hundred parts in one thousand, and the mixture may be employed without further addition of Fontainebleau sand.

The above are intended as limit figures. Any proportions comprised within these limits may be usefully employed.

The different substances are thoroughly mixed together in the shape of powder, and coloring-matters may be added—such, for instance, as oxid of cobalt for obtaining blue color, oxid of gold for obtaining red color, oxid of copper for obtaining green color, &c. The mixture is then placed in a suitable furnace and for about two hours exposed to a temperature of 1,500° to 2,000°. If the frit is not very fusible, it is simply placed on the hearth of the furnace. If, on the contrary, it is very fusible, it can be placed in a vessel, so as to prevent the frit from flowing. When the frit is sufficiently burned, it has the form of paste and is cast into water. It remains there in the state of paste and can be kept for any length of time. It is in this form that it is subsequently used, as will be seen later on. If the frit is very fusible, it is cast dry. The paste thus obtained is subsequently ground very fine. Water can be added to facilitate the grinding. It is then screened, the grade of the screen or sieve used depending on the fineness of the powder it is desired to obtain. For ordinary paste the screen No. 120 can be used, and for very fusible paste screens up to No. 90 could be used. The excess of water contained in the paste is then removed by drying in the air. In this way by the above-described method of preparation a series of pastes of different colors is obtained, the color depending, as already stated, on the metallic oxid added to the mixture at the moment of the formation of the frit. It will be readily understood that since these pastes have to be molded cold, as already stated, the chief drawback to be avoided is the sticking of the paste to the mold after the burning. It was therefore necessary to find a mold of special composition preventing sticking of the paste to the wall of the mold during the burning. Such a mold comprises as its main constituents a mixture of clay, kaolin, quartz and burnt plaster, the latter product preventing the sticking and the other products forming plastic supports. The proportions of the said substances may vary. The following proportions give in practice very good results: clay, two; kaolin, two; ground quartz, two; plaster, four. For preparing molds from this composition the substances are mixed together, and owing to their plasticity they can be easily given the desired shape for constituting molds. These molds are then burned at a temperature of 1,000° to 2,000°. After burning they are slowly cooled and then tempered in lime-water. The molds are, moreover, always kept in the said lime-water, so that they should have a certain moisture at the moment of use.

To make a glass article by means of one of the said molds, the mold is taken from the bath of lime-water and the bottom of the mold decorated with frits of various colors obtained as described, or with ordinary enamels, or with a mixture of frits and enamels. Over the decoration is heaped lightly a white paste or paste of one or even of two colors, according to circumstances, so as to fill the mold completely. To facilitate the placing in the mold of portions of frits of different colors, according to the ornamentation that the article is intended to possess, brass grates could be used, forming compartments in which to place the frits of different colors. After the frits have been put in place the brass grates are removed before placing the filling-frit. Instead of the brass grating the frits of various colors can be arranged either by means of a brush or by hand. The mold thus containing the raw material is then introduced into the mold with oxidizing or reducing atmosphere and heated, according to the fusibility, from 750° to 1,000°. The burning operation lasts about two hours. Then the mold is removed from the furnace and the article can be removed from the mold without difficulty after cooling. In these conditions and according to the nature of the frits used articles completely imitating ceramic articles or vitrified articles having the absolute transparency of glass are obtained. These articles, according to the decoration or ornamentation made at the moment of molding, will be of one or many colors, with opaque colored parts, obtained by means of frits or with transparent colored parts, obtained by means of enamels.

When it is desired to have an article with very fine grain, the molding can be effected under pressure. In these conditions the desired cohesion is given to the frit by quick burning and the said frit compressed while hot in a metal mold, (brass or cast-iron.) In these conditions an article is obtained having the same appearance as those obtained by the process hereinbefore described, but having a greater density.

I claim—

1. In the manufacture of glass articles, the operation consisting in preparing a glass composition, calcining the same, pulverizing the calcined material, placing the pulverized material while cool into a mold, then heating the pulverized material in the mold and forming the object therein by fusion, and removing the object from the mold after cooling.

2. In the manufacture of glass articles, the operation consisting in melting a mixture containing silicious matter and carbonate, pulverizing the frit thus obtained, placing the pulverized material while cool into a mold, then heating the pulverized material in the mold and forming the object therein by fusion, and removing the object from the mold after cooling.

3. In the manufacture of glass articles, the steps which consist in mixing together sand, minium, carbonate, borax and chalk, fusing said mixture, grinding the frit thus obtained, placing the ground material while cool in a mold, and then heating the ground material within the mold, and forming the article by fusion therein.

4. In the manufacture of glass articles, the steps which consist in preparing a glass composition, calcining the same, pulverizing the calcined material, placing the pulverized material while cool in a mold composed of a hardened mixture of clay, kaolin, quartz and plaster, then heating the ground material aforesaid within said mold and forming the article therein by fusion, and removing the article from the mold after cooling.

5. In the manufacture of glass articles, the steps which consist in preparing a frit, burning the same, grinding the burned material, placing the ground material while cool in a mold, quickly fusing the ground material in said mold, removing the fused material to a second mold and compressing said material while hot.

6. In the manufacture of glass articles, the steps which consist in preparing a frit, burning the same, grinding the burned material, placing the ground material while cool in a mold, fusing the ground material in said mold, and subjecting the said material while hot to pressure.

In testimony whereof I have signed this specification in the presence of two subscribing witnesses.

RENIER ESTHER HERMAN JONKERGOUW.

Witnesses:
  EMILE LEDRET,
  HANSON C. COXE.